(12) United States Patent
Xu et al.

(10) Patent No.: US 12,546,544 B2
(45) Date of Patent: Feb. 10, 2026

(54) MANIFOLD FOR HEAT EXCHANGER AND HEAT EXCHANGER

(71) Applicant: Danfoss A/S, Nordborg (DK)

(72) Inventors: Jiaqi Xu, Haiyan (CN); Yubao Liu, Jiaxing (CN); Jing Yuan, Jiaxing (CN); Huan Jin, Jiaxing (CN)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/541,912

(22) Filed: Dec. 15, 2023

(65) Prior Publication Data

US 2024/0200890 A1   Jun. 20, 2024

(30) Foreign Application Priority Data

Dec. 20, 2022 (CN) .......................... 202211653680.8
Dec. 20, 2022 (CN) .......................... 202223440322.7

(51) Int. Cl.
*F28F 9/06* (2006.01)
*F28F 9/02* (2006.01)

(52) U.S. Cl.
CPC .............. *F28F 9/06* (2013.01); *F28F 9/0243* (2013.01); *F28F 2265/22* (2013.01)

(58) Field of Classification Search
CPC ......... F28F 9/06; F28F 6/0243; F28F 2265/22
USPC ....................................................... 165/143
See application file for complete search history.

(56) References Cited

U.S. PATENT DOCUMENTS

| | | | | |
|---|---|---|---|---|
| 2,328,511 | A * | 8/1943 | Thomas | F25B 39/02 62/516 |
| 3,438,218 | A * | 4/1969 | O'Neil | F25B 43/006 62/503 |
| 3,782,131 | A * | 1/1974 | Merryfull | F25B 41/00 62/84 |
| 4,916,916 | A * | 4/1990 | Fischer | F25B 41/00 62/430 |
| 5,121,791 | A * | 6/1992 | Casterline | F28F 9/22 165/163 |
| 5,228,315 | A * | 7/1993 | Nagasaka | F25B 39/04 165/110 |
| 7,228,706 | B1* | 6/2007 | Xu | F25B 39/02 62/404 |
| 7,617,700 | B2* | 11/2009 | Lamb | F28F 27/02 62/504 |
| 8,978,992 | B2* | 3/2015 | Zillig | F16K 11/22 137/625.49 |
| 9,557,749 | B2* | 1/2017 | Sheppard | F28F 27/02 |

(Continued)

*Primary Examiner* — Claire E Rojohn, III
(74) *Attorney, Agent, or Firm* — McCormick, Paulding & Huber PLLC

(57) ABSTRACT

A manifold for a heat exchanger and a heat exchanger wherein the manifold includes: a pipe having an end portion; an end cover disposed at the end portion of the pipe and closing the end portion of the pipe to define an inner cavity in the pipe; and a discharge passage including: a first end opening into the inner cavity of the pipe, and a second end located at or adjacent to an end of the manifold and positioned at an outer peripheral surface of the manifold. The first end of the discharge passage is located on a side of the end cover facing the inner cavity of the pipe. According to embodiments of the disclosure, the stacking mounting of the heat exchangers in the axial direction of the manifold and the mounting of the heat exchanger with the end cover of the manifold contacting the ground can be achieved.

20 Claims, 17 Drawing Sheets

(56) References Cited

U.S. PATENT DOCUMENTS

| | | | |
|---|---|---|---|
| 9,945,623 B2* | 4/2018 | Sheppard | F28D 9/005 |
| 9,989,289 B2* | 6/2018 | Zolli | F25B 49/027 |
| 10,900,557 B2* | 1/2021 | Muhammad | F28D 9/005 |
| 2011/0143248 A1* | 6/2011 | Katano | H01M 8/04044 |
| | | | 429/434 |
| 2015/0369115 A1* | 12/2015 | Kim | F28F 27/02 |
| | | | 165/103 |
| 2017/0234587 A1* | 8/2017 | Jindou | F28F 9/0204 |
| | | | 62/527 |
| 2018/0156512 A1* | 6/2018 | Mislak | F28F 9/0265 |
| 2021/0404729 A1* | 12/2021 | Yoo | F28D 1/0476 |
| 2023/0341196 A1* | 10/2023 | Yuan | F28F 9/0246 |
| 2024/0200890 A1* | 6/2024 | Xu | F28F 9/06 |
| 2025/0003691 A1* | 1/2025 | Yuan | F28F 9/02 |
| 2025/0012482 A1* | 1/2025 | Liu | F24F 11/84 |

* cited by examiner

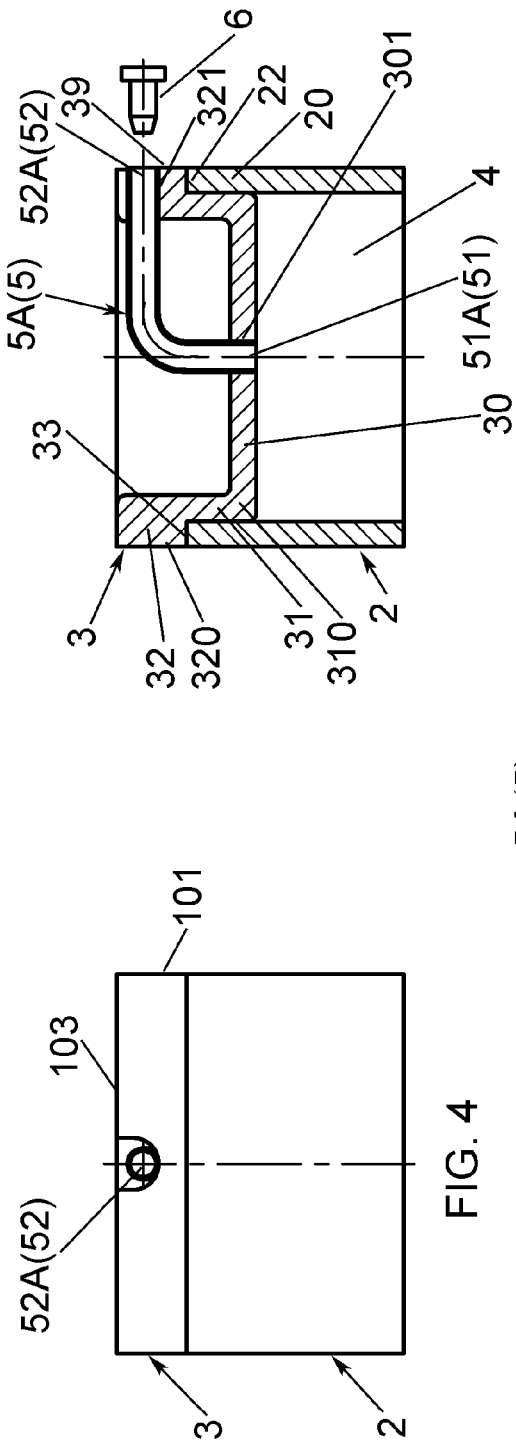
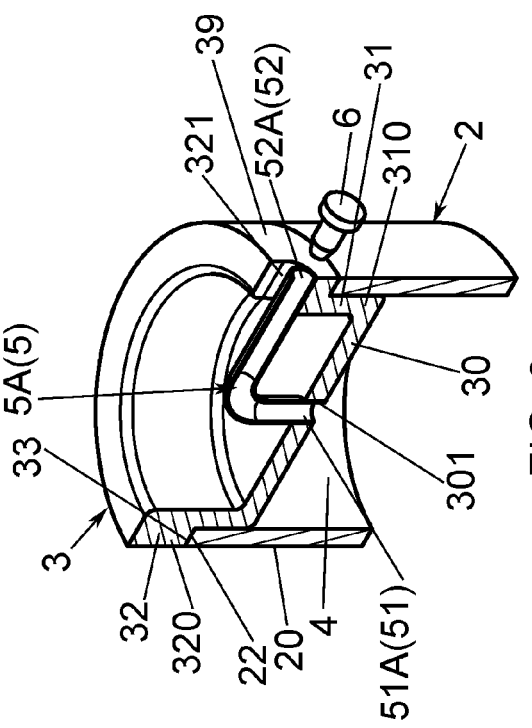

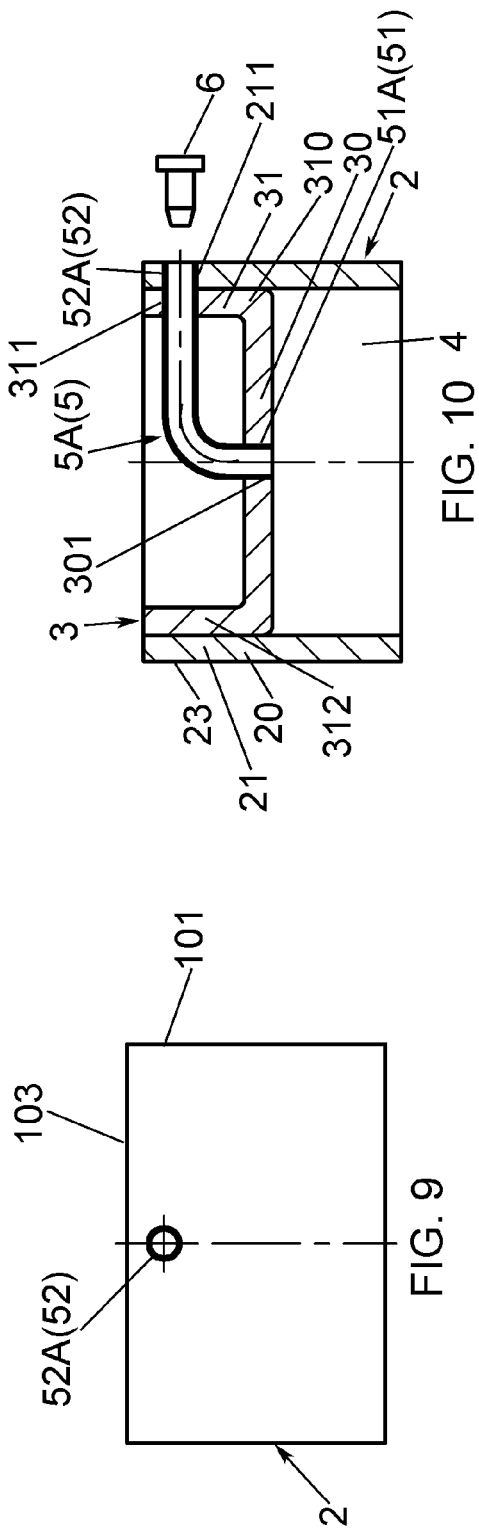
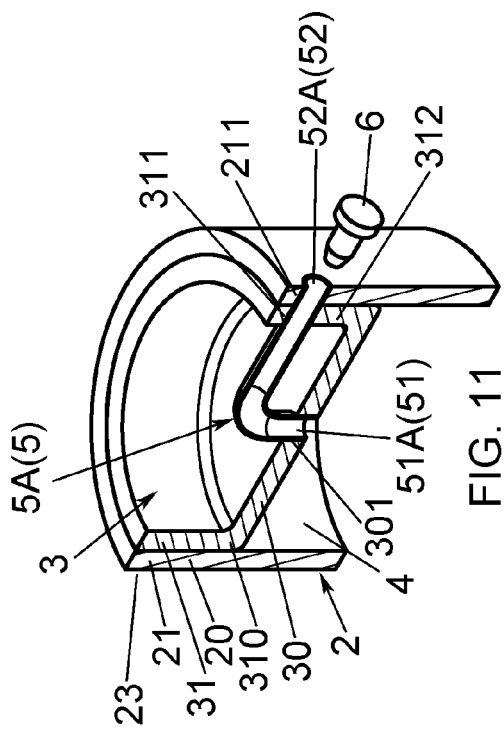

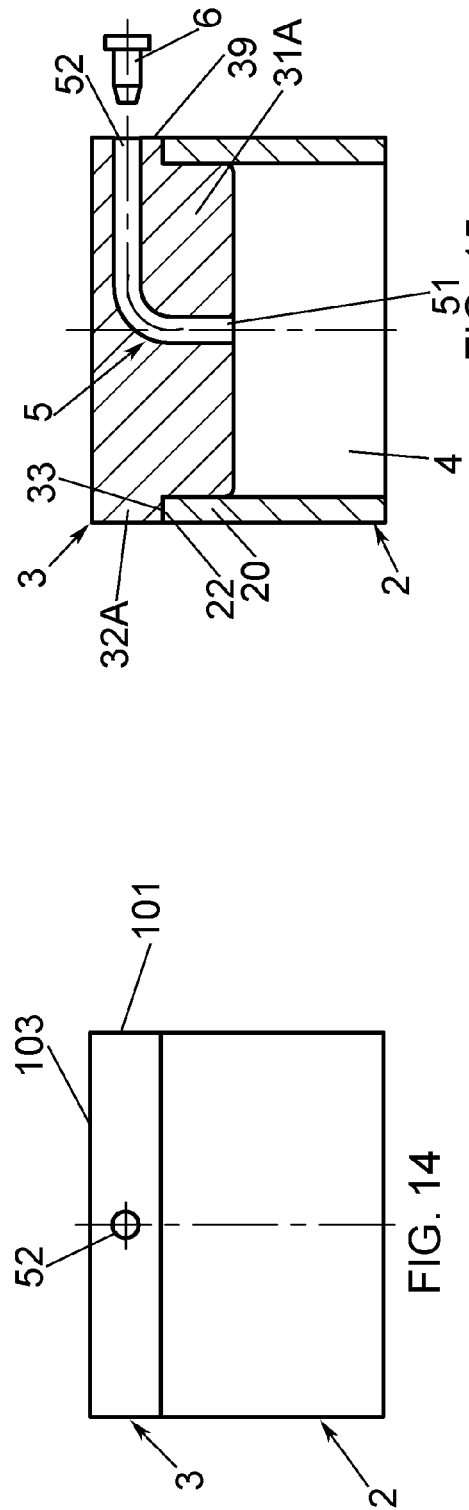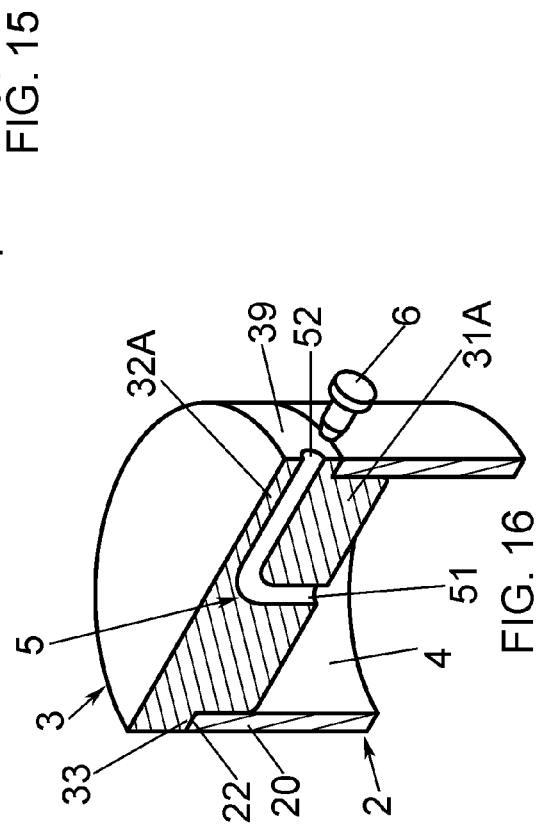

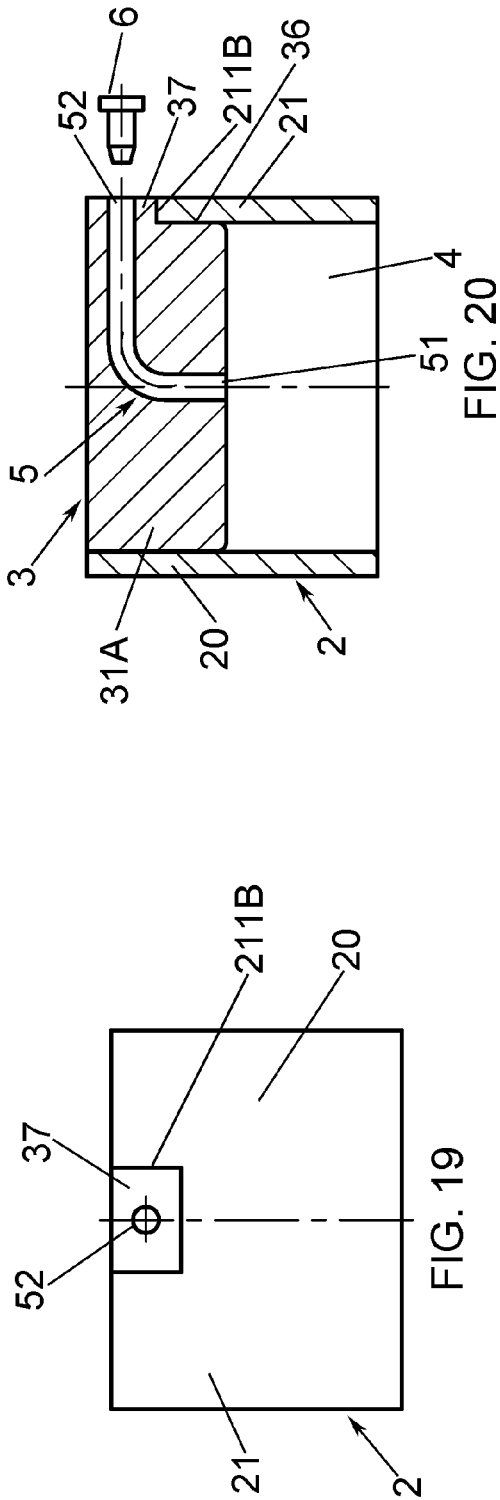

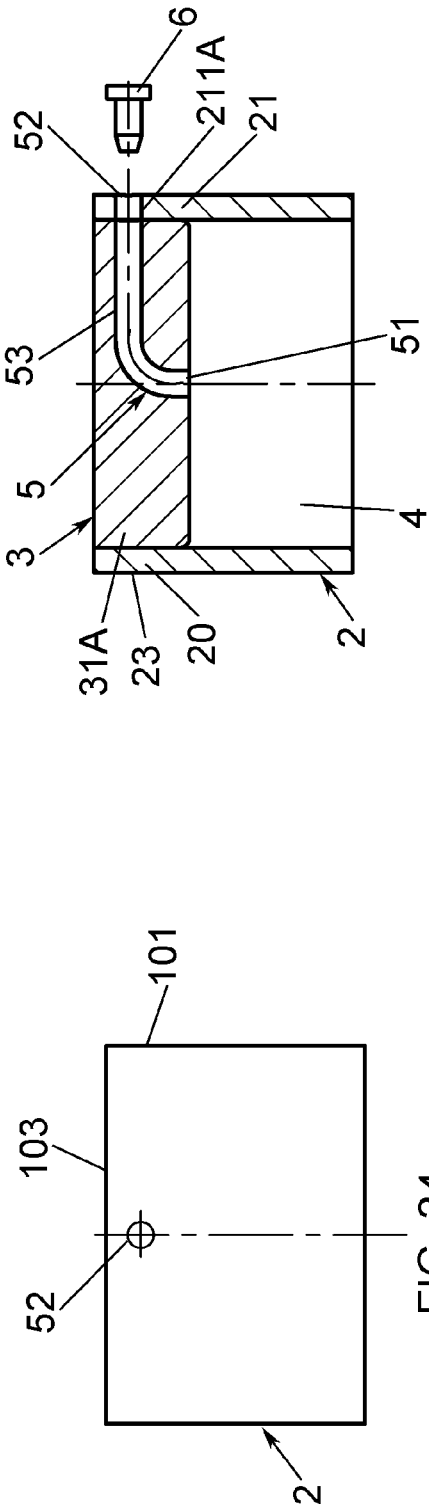
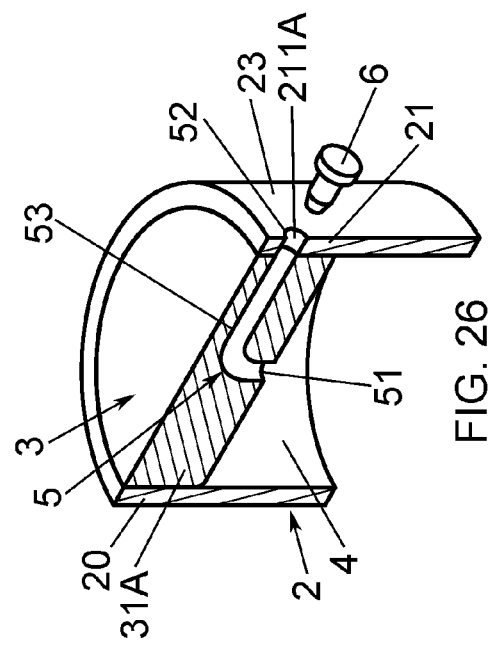

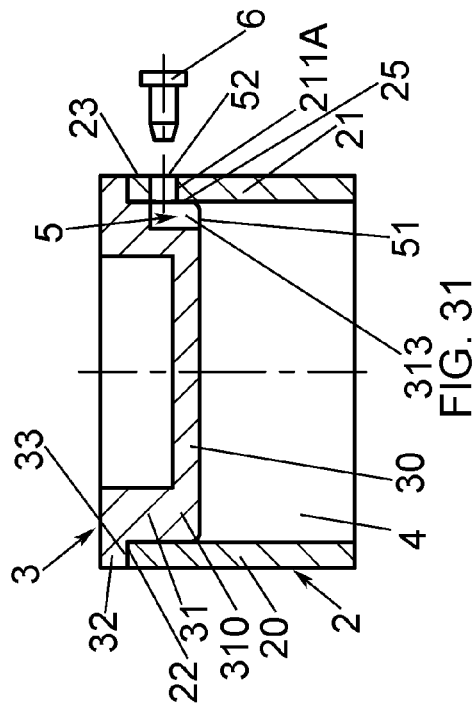
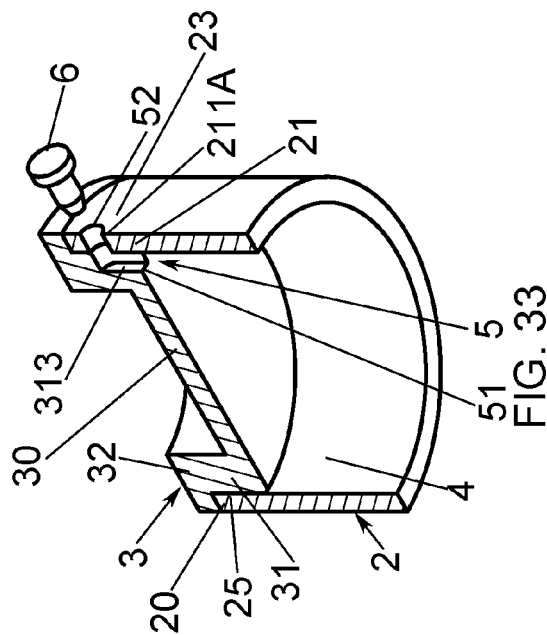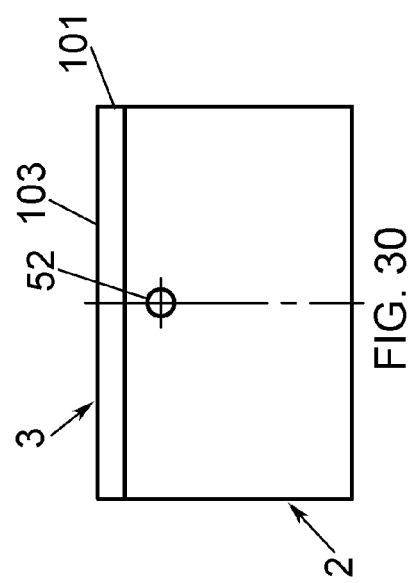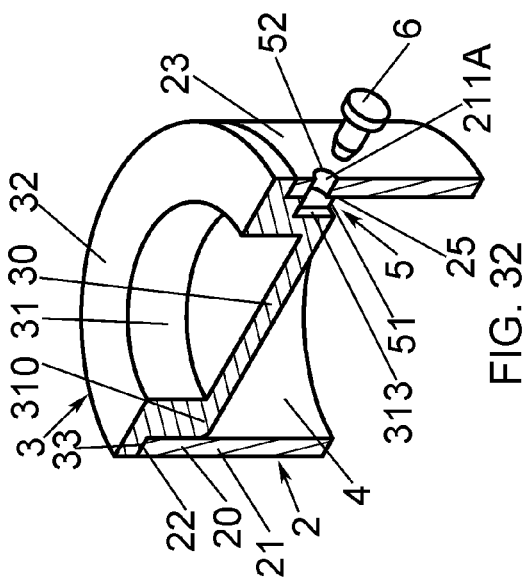

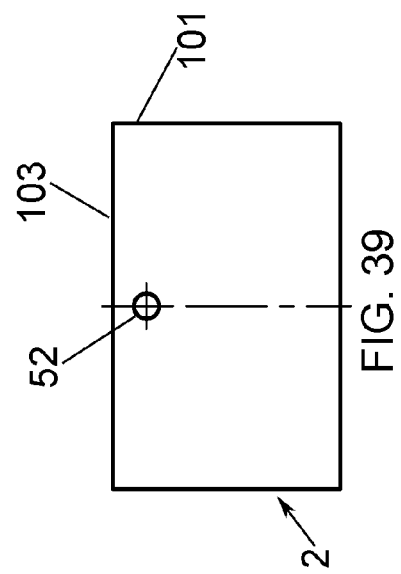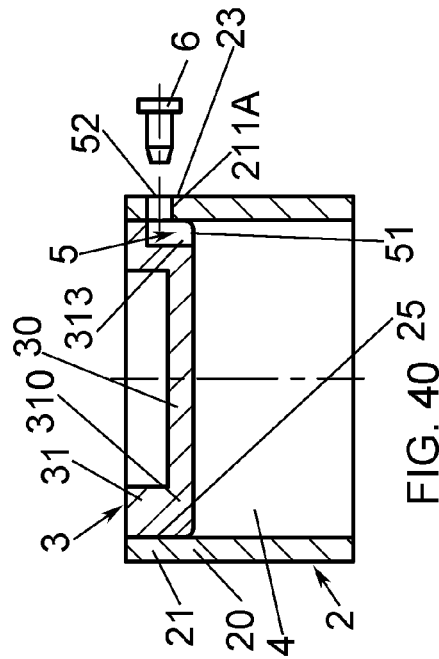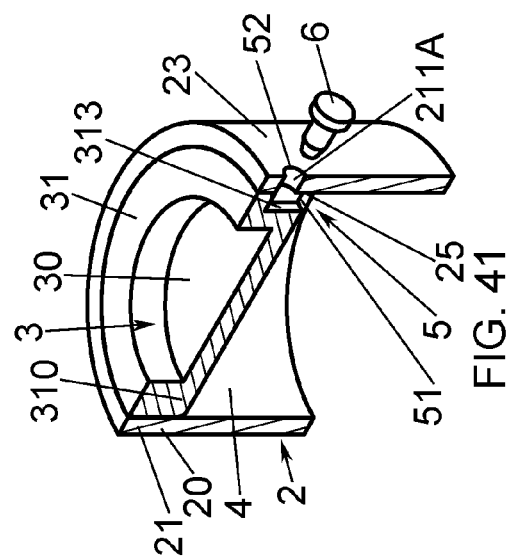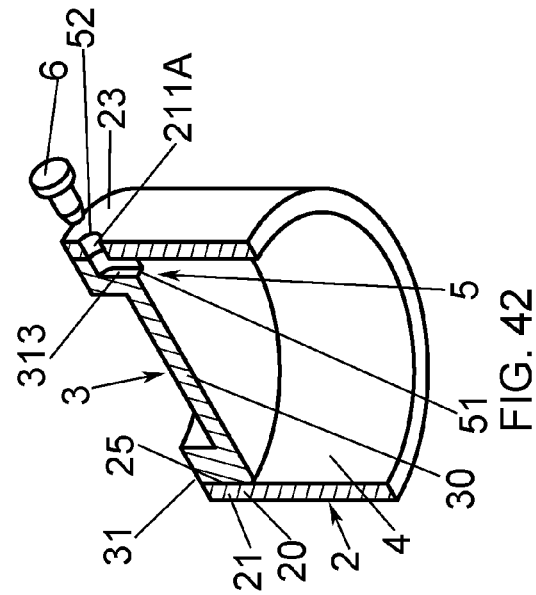

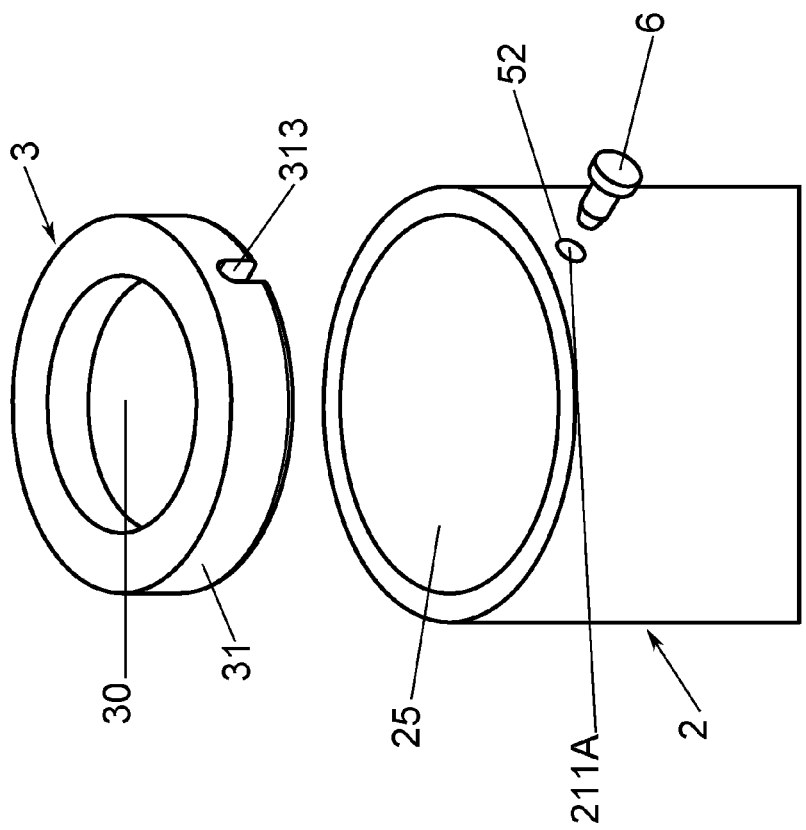

MANIFOLD FOR HEAT EXCHANGER AND HEAT EXCHANGER

CROSS-REFERENCE TO RELATED APPLICATIONS

This application claims foreign priority benefits under 35 U.S.C. § 119 from Chinese Patent Applications No. 202211653680.8, filed Dec. 20, 2022, and No. 202223440322.7, filed Dec. 20, 2022, the content of each of which is hereby incorporated by reference in its entirety.

TECHNICAL FIELD

Embodiments of the present invention relate to a manifold for a heat exchanger and a heat exchanger with the manifold.

BACKGROUND

A gas discharging valve and a liquid discharging valve are disposed at upmost and lowermost parts of a heat exchanger such as a micro-channel heat exchanger, respectively. The gas discharging valve and the liquid discharging valve cannot be directly subjected to a force, which limits the mounting manner of the heat exchanger.

SUMMARY

It is an object of embodiments of the present invention to provide a manifold for a heat exchanger and a heat exchanger with the manifold, thereby facilitating the mounting of the heat exchanger, for example.

Embodiments of the present invention provide a manifold for a heat exchanger, the manifold including: a pipe having an end portion; an end cover disposed at the end portion of the pipe and closing the end portion of the pipe to define an inner cavity in the pipe; and a discharge passage including: a first end opening into the inner cavity of the pipe, and a second end located at or adjacent to an end of the manifold and positioned at an outer peripheral surface of the manifold, the first end of the discharge passage being located on a side of the end cover facing the inner cavity of the pipe.

According to embodiments of the present invention, the manifold further including: a seal detachably connected to the second end of the discharge passage to seal the second end of the discharge passage.

According to embodiments of the present invention, the discharge passage has a substantially L-shaped shape.

According to embodiments of the present invention, the second end of the discharge passage is located at or adjacent to the end portion of the pipe and positioned at an outer peripheral surface of the pipe; or the second end of the discharge passage is located at an outer peripheral surface of the end cover or a surface of a portion of the end cover exposing from an opening in a pipe wall of the pipe.

According to embodiments of the present invention, the end cover includes: a first tubular portion inserted in the end portion of the pipe; and an end plate closing an end of the first tubular portion facing the inner cavity of the pipe, the end plate has a through hole, and the discharge passage includes a discharge passage tube of which a first end is inserted in the through hole of the end plate.

According to embodiments of the present invention, the first tubular portion has a first tubular portion wall and an opening passing through the first tubular portion wall, the pipe has a pipe wall and an opening passing through the pipe wall at the end portion of the pipe and substantially aligning with the opening of the first tubular portion, and a second end of the discharge passage tube is inserted in the opening of the first tubular portion and the opening of the pipe.

According to embodiments of the present invention, the opening of the first tubular portion is a through hole or a notch, and the opening of the pipe is a through hole or a notch.

According to embodiments of the present invention, the end cover further includes: a second tubular portion connected with the first tubular portion; and a step portion formed between the first tubular portion and the second tubular portion and abutting against an end face of the end portion of the pipe.

According to embodiments of the present invention, the second tubular portion has a second tubular portion wall and an opening passing through the second tubular portion wall, and the second end of the discharge passage tube is inserted in the opening of the second tubular portion.

According to embodiments of the present invention, the opening of the second tubular portion is a through hole or a notch.

According to embodiments of the present invention, the end cover includes: a first tubular portion inserted in the end portion of the pipe; and an end plate closing an end of the first tubular portion facing the inner cavity of the pipe; and the first tubular portion has a first tubular portion wall and a groove formed on an outer peripheral surface of the first tubular portion wall, the pipe has a pipe wall and a through hole passing through the pipe wall at the end portion of the pipe and substantially aligning with the groove of the first tubular portion; and the discharge passage includes: a passage portion formed by the groove of the first tubular portion and an inner peripheral surface of the end portion of the pipe; and the through hole of the pipe.

According to embodiments of the present invention, the end cover further includes: a second tubular portion connected with the first tubular portion; and a step portion formed between the first tubular portion and the second tubular portion and abutting against an end face of the end portion of the pipe.

According to embodiments of the present invention, the end cover includes a first portion inserted in the end portion of the pipe; and the discharge passage includes an end cover passage formed in the first portion of the end cover.

According to embodiments of the present invention, the discharge passage further includes a through hole passing through a pipe wall of the pipe at the end portion of the pipe and being in fluid communication with the end cover passage.

According to embodiments of the present invention, the end cover includes: a first portion inserted in the end portion of the pipe; and a protrusion protruding from an outer peripheral surface of the first portion on a side of the first portion away from the inner cavity of the pipe, the discharge passage is formed in the first portion of the end cover and the protrusion, the second end of the discharge passage is located in the protrusion, the pipe has a pipe wall and a notch passing through the pipe wall at the end portion of the pipe, and the protrusion is located in the notch.

According to embodiments of the present invention, the end cover includes: a first portion inserted in the end portion of the pipe; and a second portion connected with the first portion; and a step portion formed between the first portion and the second portion and abutting against an end face of the end portion of the pipe; and the discharge passage is formed in the first portion and the second portion of the end cover, and the second end of the discharge passage is located in the second portion.

According to embodiments of the present invention, at least a portion of the discharge passage is located in the end cover.

According to embodiments of the present invention, the second end of the discharge passage is spaced apart from an end face of the end of the manifold.

According to embodiments of the present invention, the first end of the discharge passage is located at a central portion of the end cover.

According to embodiments of the present invention, the discharge passage tube is a capillary tube.

Embodiments of the present disclosure further provide a heat exchanger including: a heat exchange tube; and the abovementioned manifold, wherein an end of the heat exchange tube is connected and fluidly communicated with the manifold.

With the manifold and the heat exchanger according to the embodiments of the present invention, for example, the mounting of the heat exchanger can be facilitated.

BRIEF DESCRIPTION OF THE DRAWINGS

FIG. 4 is a schematic enlarged right view of a part A of the manifold shown in FIG. 3;

FIG. 5 is a schematic enlarged sectional front view of the part A of the manifold shown in FIG. 3;

FIG. 6 is a schematic enlarged sectional perspective view of the part A of the manifold shown in FIG. 3;

FIG. 9 is a schematic enlarged right view of a part B of the manifold shown in FIG. 8;

FIG. 10 is a schematic enlarged sectional front view of the part B of the manifold shown in FIG. 8;

FIG. 11 is a schematic enlarged sectional perspective view of the part B of the manifold shown in FIG. 8;

FIG. 14 is a schematic enlarged right view of a part C of the manifold shown in FIG. 13;

FIG. 15 is a schematic enlarged sectional front view of the part C of the manifold shown in FIG. 13;

FIG. 16 is a schematic enlarged sectional perspective view of the part C of the manifold shown in FIG. 13;

FIG. 19 is a schematic enlarged right view of a part D of the manifold shown in FIG. 18;

FIG. 20 is a schematic enlarged sectional front view of the part D of the manifold shown in FIG. 18;

FIG. 21 is a schematic enlarged sectional perspective view of the part D of the manifold shown in FIG. 18;

FIG. 24 is a schematic enlarged right view of a part E of the manifold shown in FIG. 23;

FIG. 25 is a schematic enlarged sectional front view of the part E of the manifold shown in FIG. 23;

FIG. 26 is a schematic enlarged sectional perspective view of the part E of the manifold shown in FIG. 23;

FIG. 30 is a schematic enlarged right view of a part F of the manifold shown in FIG. 28;

FIG. 31 is a schematic enlarged sectional front view of the part F of the manifold shown in FIG. 28;

FIG. 32 is a schematic enlarged sectional perspective view of the part F of the manifold shown in FIG. 28;

FIG. 33 is another schematic enlarged sectional perspective view of the part F of the manifold shown in FIG. 28;

FIG. 39 is a schematic enlarged right view of a part H of the manifold shown in FIG. 37;

FIG. 40 is a schematic enlarged sectional front view of the part H of the manifold shown in FIG. 37;

FIG. 41 is a schematic enlarged sectional perspective view of the part H of the manifold shown in FIG. 37;

FIG. 42 is another schematic enlarged sectional perspective view of the part H of the manifold shown in FIG. 37; and FIG. 43 is a schematic enlarged perspective view of a part I of the manifold shown in FIG. 38.

DETAILED DESCRIPTION

The present invention is further explained in combination with the accompanying drawings and specific embodiments.

Figure 1:
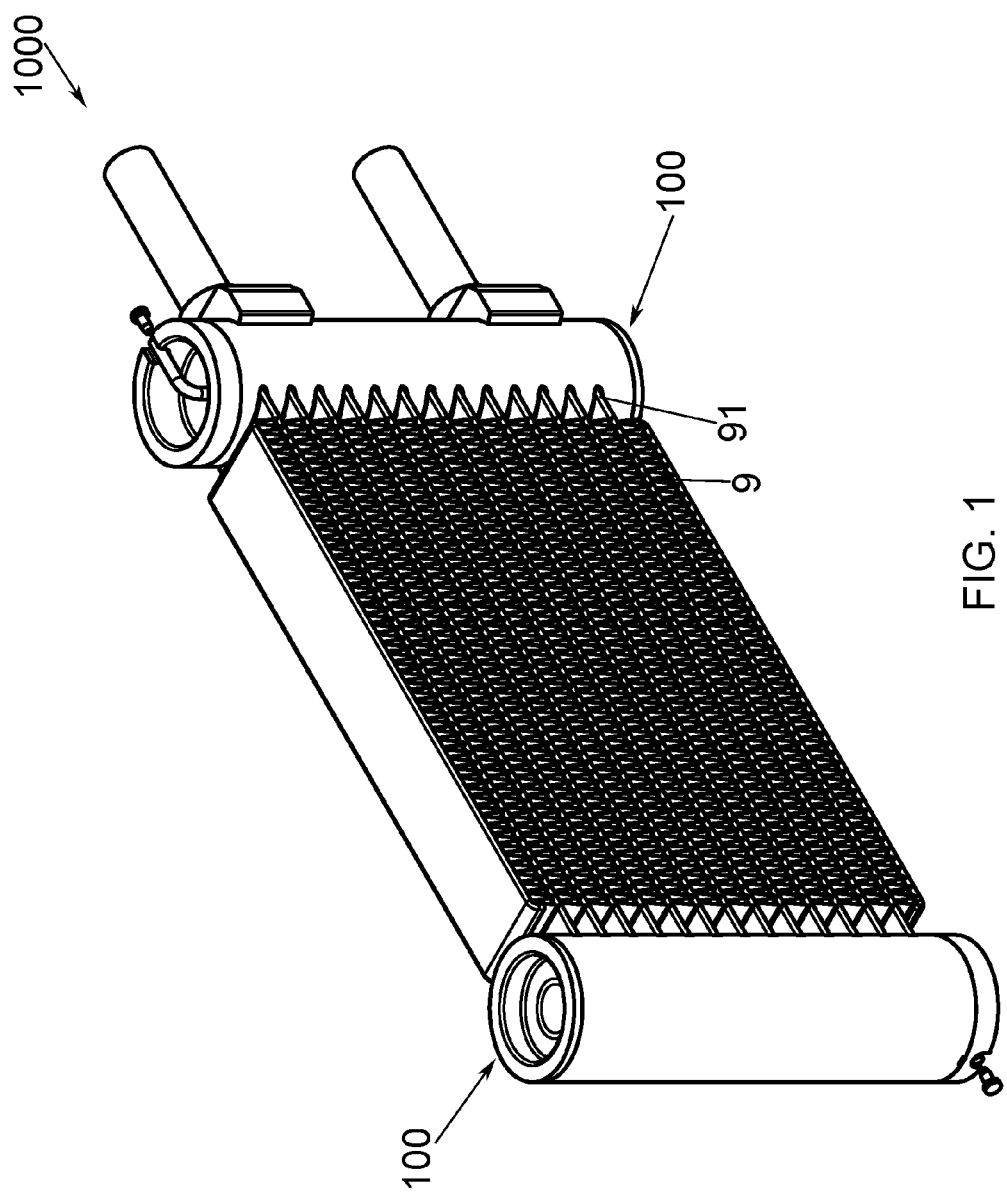
FIG. 1 is a schematic perspective view of a heat exchanger according to an embodiment of the present invention.
Figure 3:
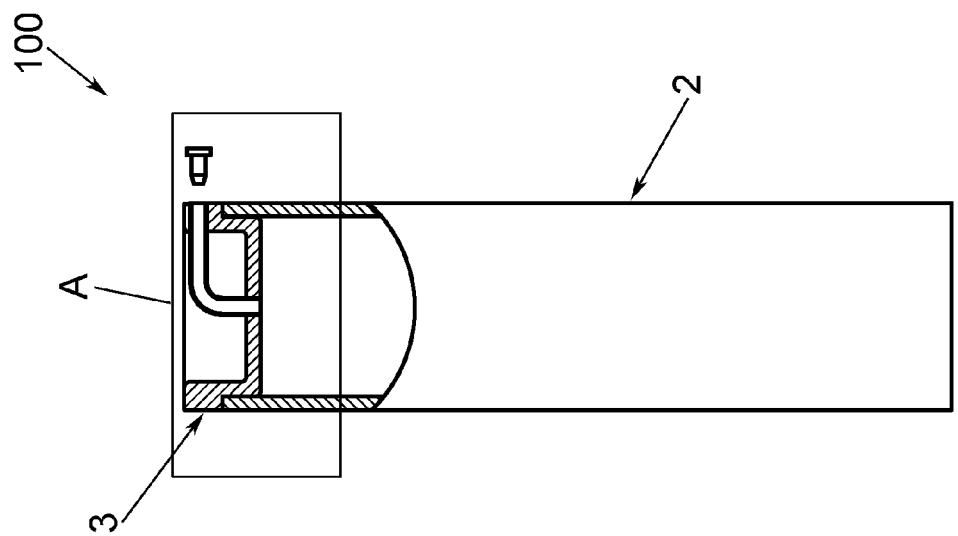
FIG. 3 is a schematic partial sectional front view of the manifold shown in FIG. 2.
Figure 2:
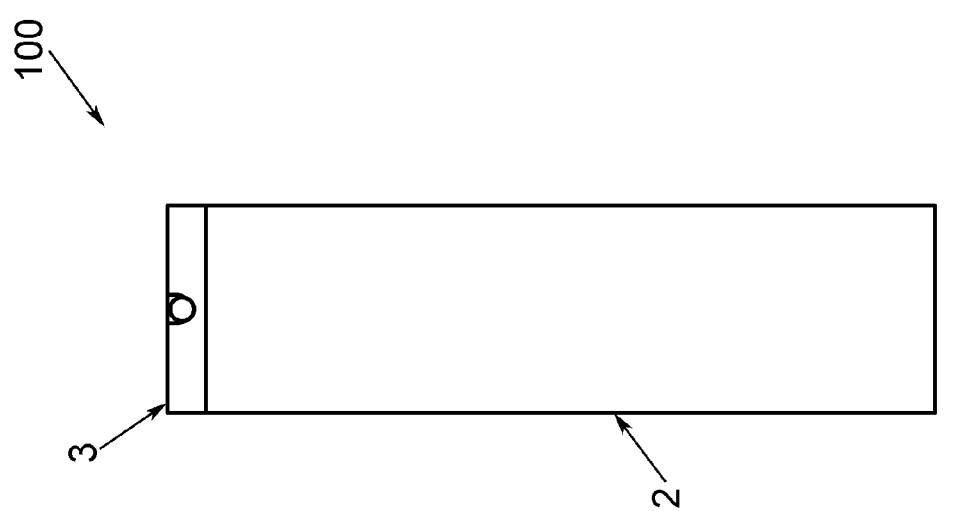
FIG. 2 is a schematic right view of a manifold according to an embodiment of the present invention.
Figure 8:
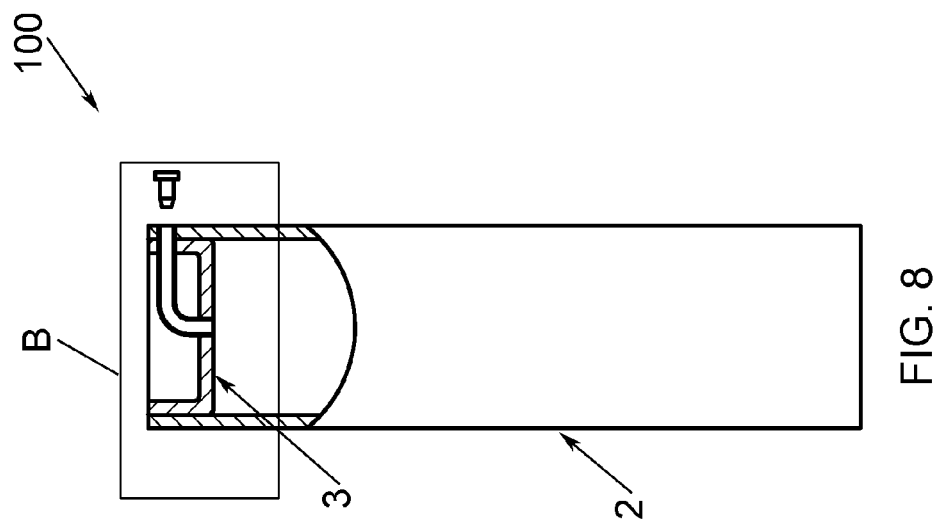
FIG. 8 is a schematic partial sectional front view of the manifold shown in FIG. 7.
Figure 7:
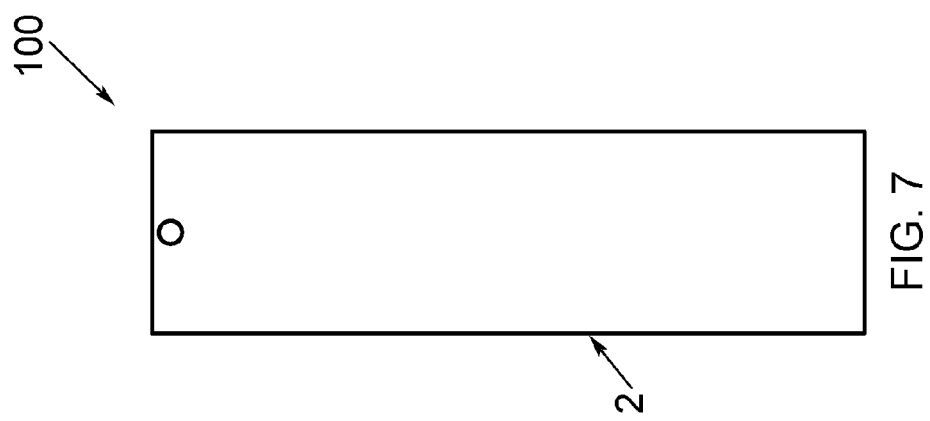
FIG. 7 is a schematic right view of a manifold according to another embodiment of the present invention.
Figure 13:
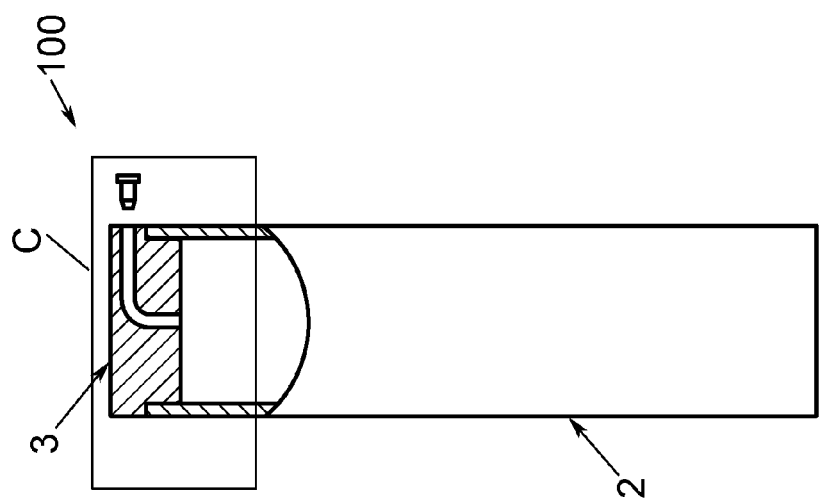
FIG. 13 is a schematic partial sectional front view of the manifold shown in FIG. 12.
Figure 12:
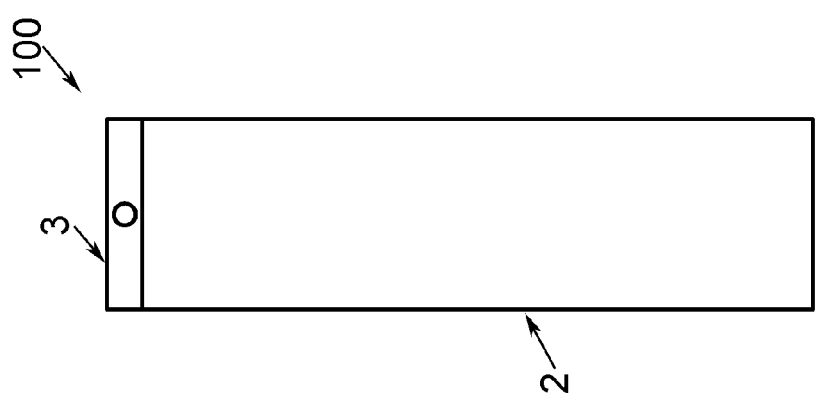
FIG. 12 is a schematic right view of a manifold according to yet another embodiment of the present invention.
Figure 18:
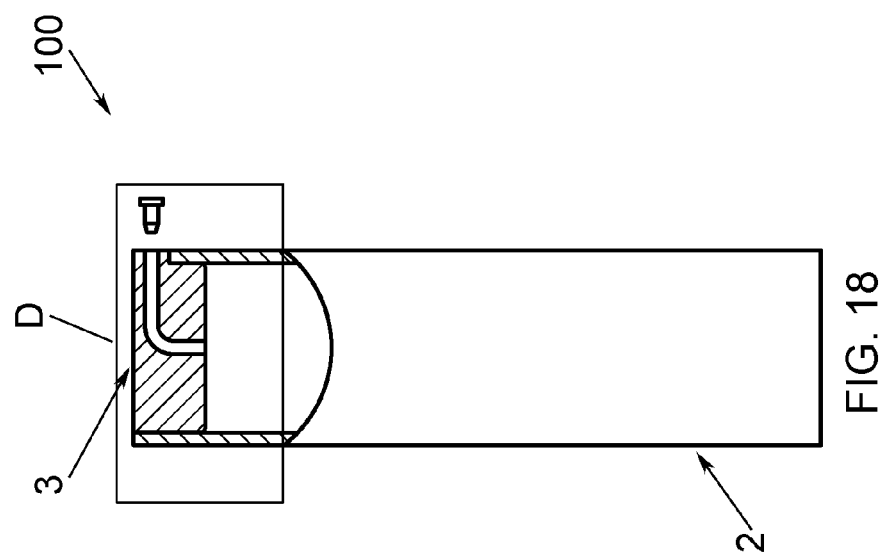
FIG. 18 is a schematic partial sectional front view of the manifold shown in FIG. 17.
Figure 17:
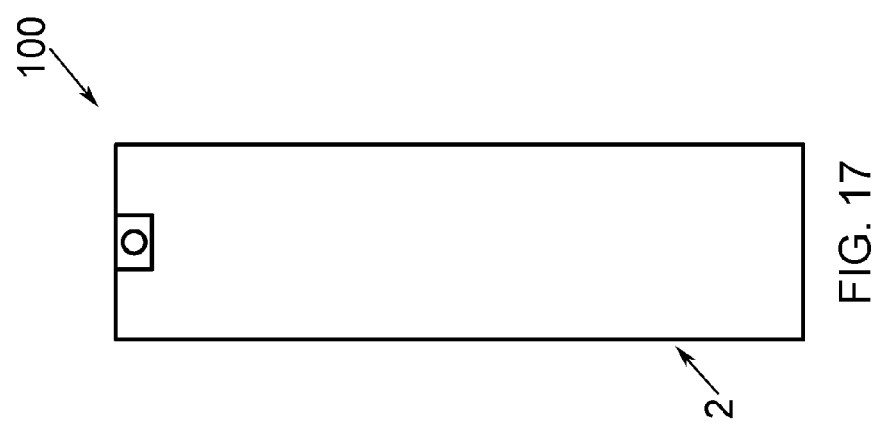
FIG. 17 is a schematic right view of a manifold according to still another embodiment of the present invention.
Figure 23:
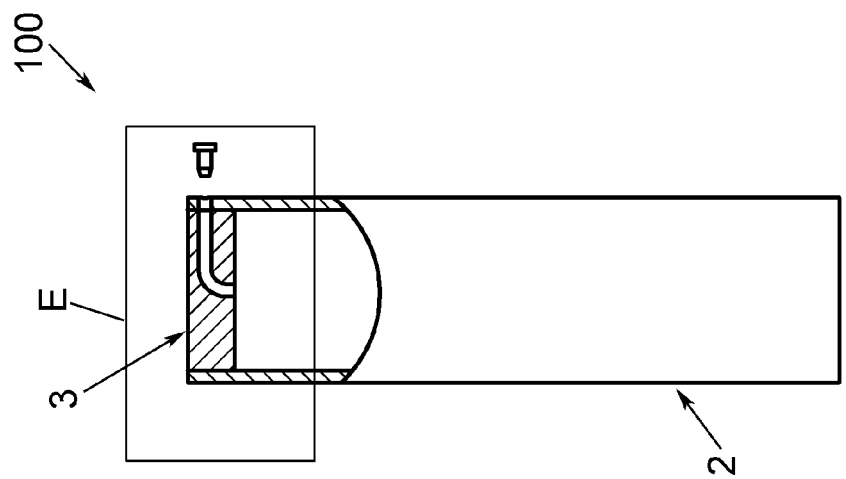
FIG. 23 is a schematic partial sectional front view of the manifold shown in FIG. 22.
Figure 22:
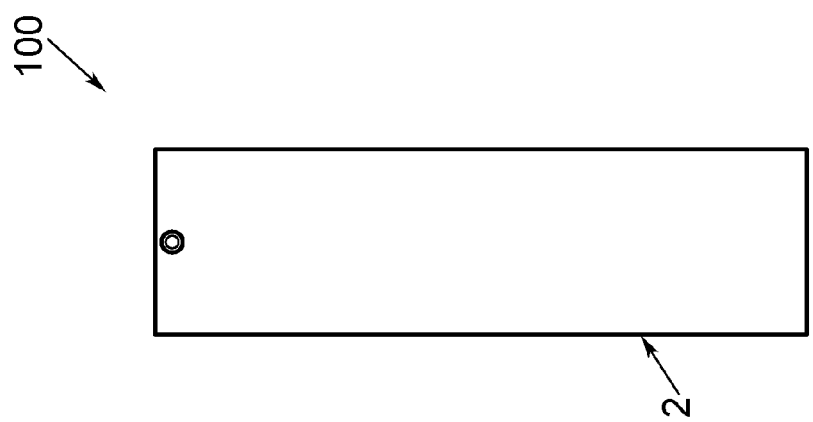
FIG. 22 is a schematic right view of a manifold according to yet still another embodiment of the present invention.
Figure 29:
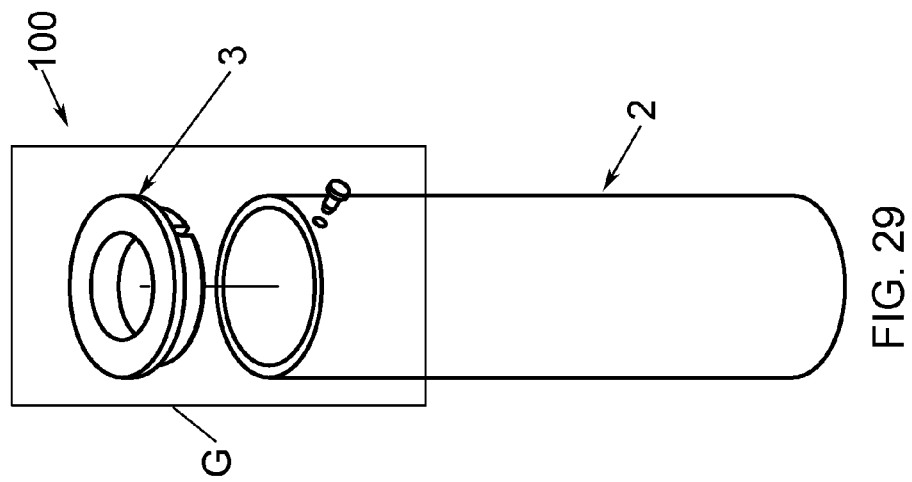
FIG. 29 is a schematic exploded perspective view of the manifold shown in FIG. 27.
Figure 28:
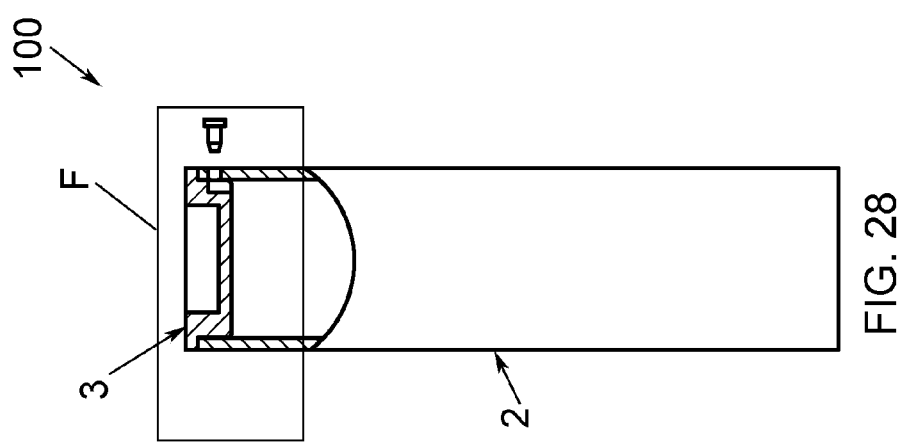
FIG. 28 is a schematic partial sectional front view of the manifold shown in FIG. 27.
Figure 27:
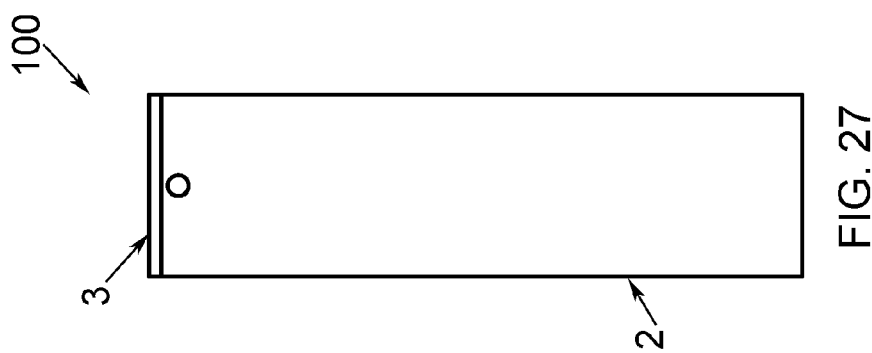
FIG. 27 is a schematic right view of the manifold according to a further embodiment of the present invention.
Figure 35:
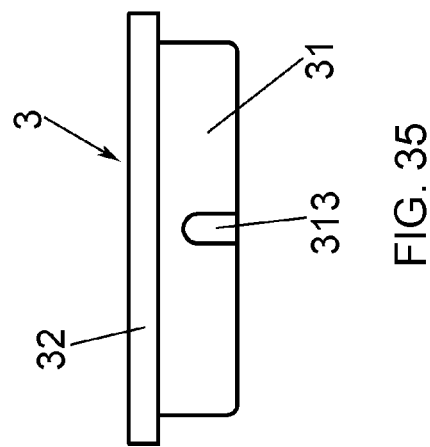
FIG. 35 is a schematic right view of an end cover of the manifold shown in FIG. 29.
Figure 34:
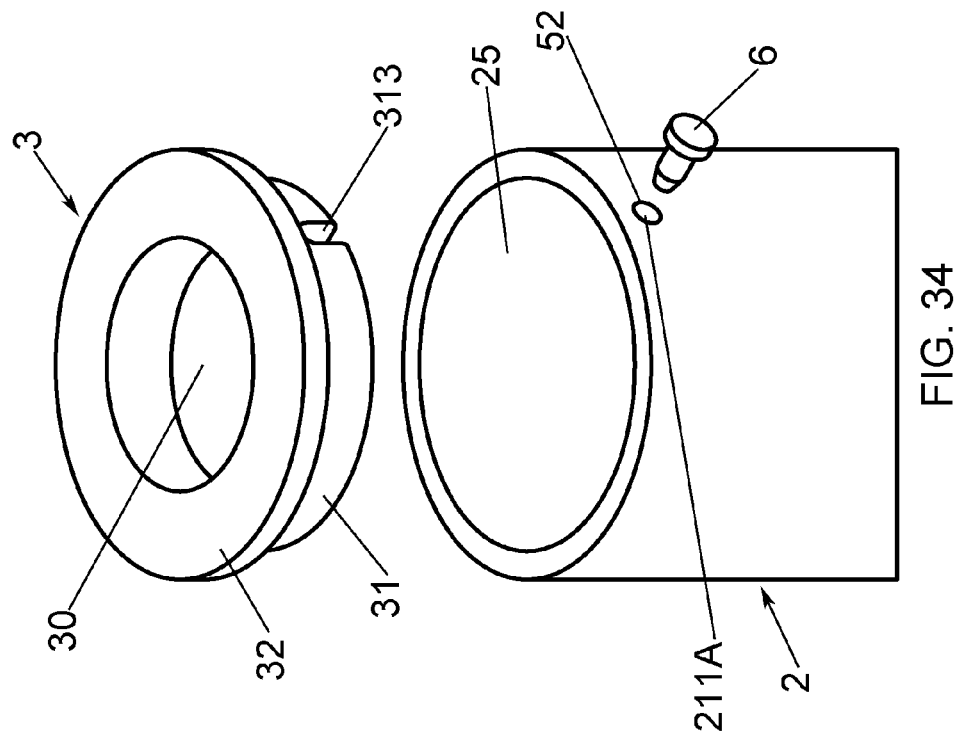
FIG. 34 is a schematic enlarged perspective view of a part G of the manifold shown in FIG. 29.
Figure 38:
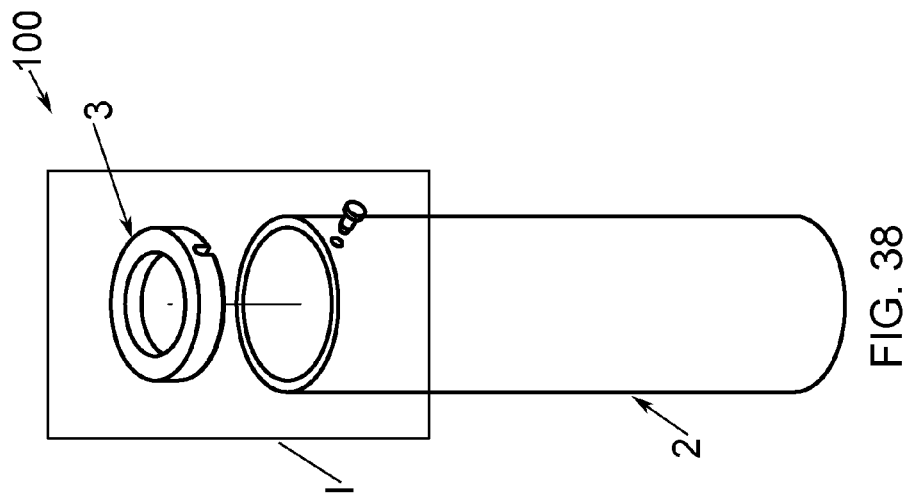
FIG. 38 is a schematic exploded perspective view of the manifold shown in FIG. 37.
Figure 37:
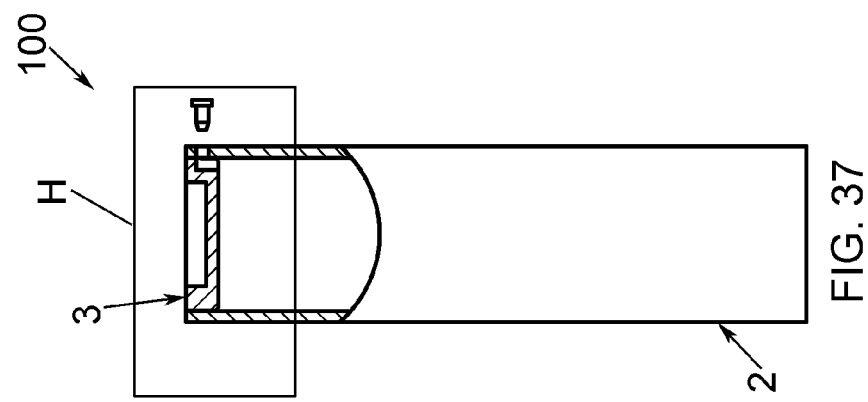
FIG. 37 is a schematic partial sectional front view of the manifold shown in FIG. 36.
Figure 36:
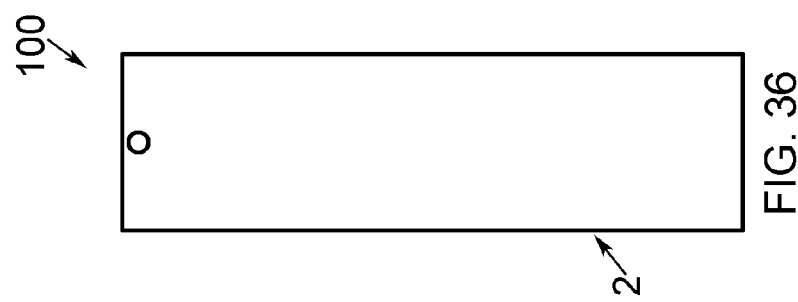
FIG. 36 is a schematic right view of a manifold according to another embodiment of the present invention.

Referring to FIG. 1, the heat exchanger 1000 according to embodiments of the present invention includes a heat exchange tube 9 and a manifold 100. An end 91 of the heat exchange tube 9 is connected and fluidly communicated with the manifold 100. The heat exchanger 1000 further includes fins arranged alternately with the heat exchange tubes 9.

Referring to FIGS. 2 to 43, according to embodiments of the present invention, the manifold 100 includes: a pipe 2 having an end portion 20; an end cover 3 disposed at the end portion 20 of the pipe 2 and closing the end portion 20 of the pipe 2 to define an inner cavity 4 in the pipe 2; and a discharge passage 5. The discharge passage 5 includes: a first end 51 opening into the inner cavity 4 of the pipe 2, and a second end 52 located at or adjacent to an end 101 of the manifold 100 and positioned at an outer peripheral surface of the manifold 100, thereby leading to an outside of the manifold 100. The first end 51 of the discharge passage 5 may be located on a side of the end cover 3 facing the inner cavity 4 of the pipe 2. The manifold 100 further includes: a seal 6 detachably connected to the second end 52 of the discharge passage 5 to seal the second end 52 of the discharge passage 5.

Referring to FIGS. 3, 5, 6, 8, 10, 11, 13, 15, 16, 18, 20, 21, 23, 25, 26, 28, 31, 32, 33, 37, 40, 41 and 42, according to embodiments of the present invention, the discharge passage 5 may have a substantially L-shaped shape. The discharge passage may have an arc shape at a junction of two segments of the discharge passage. At least a portion of the discharge passage 5 may be located in the end cover 3. The second end 52 of the discharge passage 5 may be spaced apart from an end face 103 of the end 101 of the manifold 100. The first end 51 of the discharge passage 5 may be located at a central portion or another portion of the end cover 3.

Referring to FIGS. 2 to 43, according to embodiments of the present invention, the second end 52 of the discharge passage 5 is located at or adjacent to the end portion 20 of the pipe 2 and positioned at an outer peripheral surface 23 of the pipe 2; or the second end 52 of the discharge passage 5 is located at an outer peripheral surface 39 of the end cover 3 or a surface of a portion (for example, a projection 39) of the end cover 3 exposing from an opening 211 in a pipe wall 21 of the pipe 2 (referring to FIGS. 17 to 21).

Referring to FIGS. 2 to 11, according to embodiments of the present invention, the end cover 3 includes: a first tubular portion 31 inserted in the end portion 20 of the pipe 2; and an end plate 30 closing an end 310 of the first tubular portion 31 facing the inner cavity 4 of the pipe 2. The end plate 30 has a through hole 301, and the discharge passage 5 includes a discharge passage tube 5A. A first end 51A of the discharge passage tube 5A is inserted in the through hole 301 of the end plate 30. The discharge passage tube 5A may be a capillary tube. The material of the capillary tube may be the same as that of the end cover 3, and the capillary tube may be welded to the end cover 3.

Referring to FIGS. 7 to 11, according to embodiments of the present invention, the first tubular portion 31 has a first tubular portion wall 312 and an opening 311 passing through the first tubular portion wall 312. The pipe 2 has a pipe wall 21 and an opening 211 passing through the pipe wall 21 at the end portion 20 of the pipe 2 and substantially aligning with the opening 311 of the first tubular portion 31. A second end 52A of the discharge passage tube 5A is inserted in the opening 311 of the first tubular portion 31 and the opening 211 of the pipe 2. The opening 311 of the first tubular portion 31 may be a through hole or a notch, and the opening 211 of the pipe 2 may be a through hole or a notch. The through hole may be circular and the notch may be semicircular. The second end 52A of the discharge passage tube 5A is inserted in the opening 311 of the first tubular portion 31 and the opening 211 of the tube 2 to ensure that the discharge passage tube cannot be pressed to deform when the end cover contacts the ground or receives a force.

Referring to FIGS. 2 to 6, according to embodiments of the present invention, the end cover 3 further includes: a second tubular portion 32 connected with the first tubular portion 31; and a step portion 33 formed between the first tubular portion 31 and the second tubular portion 32 and abutting against an end face 22 of the end portion 20 of the pipe 2. In an example of the present invention, the second tubular portion 32 has a second tubular portion wall 320 and an opening 321 passing through the second tubular portion wall 320, and the second end 52A of the discharge passage tube 5A is inserted in the opening 321 of the second tubular portion 32. The opening 321 of the second tubular portion 32 may be a through hole or a notch. The through hole may be circular and the notch may be semicircular. The second end 52A of the discharge passage tube 5A is inserted in the opening 321 of the second tubular portion 32 to ensure that the discharge passage tube cannot be pressed to deform when the end cover contacts the ground or receives a force.

Referring to FIGS. 27 to 43, according to embodiments of the present invention, the end cover 3 includes: a first tubular portion 31 inserted in the end portion 20 of the pipe 2; and an end plate 30 closing an end 310 of the first tubular portion 31 facing the inner cavity 4 of the pipe 2. The first tubular portion 31 has a first tubular portion wall 312 and a groove 313 formed on an outer peripheral surface of the first tubular portion wall 312. The pipe 2 has a pipe wall 21 and a through hole 211A passing through the pipe wall 21 at the end portion 20 of the pipe 2 and substantially aligning with the groove 313 of the first tubular portion 31. The discharge passage 5 includes: a passage portion formed by the groove 313 of the first tubular portion 31 and an inner peripheral surface 25 of the end portion 20 of the pipe 2; and the through hole 211A of the pipe 2. The passage portion formed by the inner peripheral surface 25 of the end portion 20 of the pipe 2 and the groove 313 forms the first end 51 of the discharge passage 5 and has an opening, at an end, on a side facing the inner cavity 4 of the pipe 2, of the end cover 3. The through hole 211A of the pipe 2 constitutes the second end 52 of the discharge passage 5. Referring to FIGS. 27 to 35, according to embodiments of the present invention, the end cover 3 may further include: a second tubular portion 32 connected with the first tubular portion 31; and a step portion 33 formed between the first tubular portion 31 and the second tubular portion 32 and abutting against an end face 22 of the end portion 20 of the pipe 2.

Referring to FIGS. 7 to 11 and FIGS. 36 to 43, according to embodiments of the present invention, in the absence of the second tubular portion 32 in the end cover 3, an end face of the end cover 3 away from the inner cavity 4 of the pipe 2 may be flush with or lower than the end face 22 of the end portion 20 of the pipe 2. The dimension of the end cover 3 in a circumferential direction of the pipe 2 can ensure that the discharge passage tube 5A cannot be pressed to deform when the end cover contacts the ground or receives a force.

Referring to FIGS. 12 to 26, according to embodiments of the present invention, the end cover 3 includes a first portion 31A inserted in the end portion 20 of the pipe 2; and the discharge passage 5 includes an end cover passage 53 formed in the first portion 31A of the end cover 3.

Referring to FIGS. 22 to 26, according to embodiments of the present invention, the discharge passage 5 further includes a through hole 211A passing through the pipe wall 21 of the pipe 2 at the end portion 20 of the pipe 2, and the through hole 211A is in fluid communication with the end cover passage 53.

Referring to FIGS. 17 to 21, according to embodiments of the present invention, the end cover 3 includes: a first portion 31A inserted in the end portion 20 of the pipe 2; and a protrusion 37 protruding from the outer peripheral surface 36 of the first portion 31A on a side of the first portion 31A away from the inner cavity 4 of the pipe 2. The discharge passage 5 is formed in the first portion 31A of the end cover 3 and the protrusion 37, and the second end 52 of the discharge passage 5 is located in the protrusion 37. The pipe 2 has a pipe wall 21 and a notch 211B passing through the pipe wall 21 at the end portion 20 of the pipe 2, and the protrusion 37 is located in the notch 211B. According to embodiments of the present invention, the end face of the end cover 3 away from the inner cavity 4 of the pipe 2 is flush with or lower than the end face 22 of the end portion 20 of the pipe 2. The dimension of the end cover 3 in the circumferential direction of the pipe 2 can ensure that the discharge passage tube 5A cannot be pressed to deform when the end cover contacts the ground or receives a force.

Referring to FIGS. 12 to 16, according to embodiments of the present invention, the end cover 3 includes: a first portion 31A inserted in the end portion 20 of the pipe 2; and a second portion 32A connected with the first portion 31A; and a step portion 33 formed between the first portion 31A and the second portion 32A and abutting against the end face 22 of the end portion 20 of the pipe 2. The discharge passage 5 is formed in the first portion 31A and the second portion 32A of the end cover 3, and the second end 52 of the discharge passage 5 is located in the second portion 32A.

Referring to FIGS. 22 to 26, according to embodiments of the present invention, in the absence of the second portion 32A in the end cover 3, the end face of the end cover 3 away from the inner cavity 4 of the pipe 2 may be flush with or lower than the end face 22 of the end portion 20 of the pipe 2.

According to embodiments of the present invention, the first tubular portion 31 of the end cover 3 and the first portion 31A of the end cover 3 may be fitted in the pipe 2 to seal the end portion 20 of the pipe 2. The end cover 3 may be welded to the pipe 2.

According to embodiments of the present invention, the discharge passage 5 may have a fluid passageway with a circular cross-section. In order to ensure the gas discharging efficiency and the liquid discharging efficiency, the cross-sectional area of the fluid passageway of the discharge passage 5 is great than or equal to $4\pi$ mm$_2$.

With the manifold and the heat exchanger according to the embodiments of the present invention, for example, the mounting of the heat exchanger can be facilitated.

With the manifold and the heat exchanger according to the embodiments of the present invention, the mounting space of the heat exchanger is reasonably utilized, and the seal is disposed on the outer peripheral surface of the manifold, thereby facilitating the maintenance operation, ensuring the gas discharging effect and the liquid discharging effect, and realizing the stacking mounting of the heat exchangers in the axial direction of the manifold and the mounting of the heat exchanger with the end cover of the manifold contacting the ground. In addition, the discharge passage 5 can discharge the gas at the upmost position of the internal space of the heat exchanger, and can discharge the liquid at the lowermost position of the internal space of the heat exchanger.

With the manifold and the heat exchanger according to the embodiments of the present invention, the discharge passage 5 cannot be crushed when another object is stacked directly on the manifold or when the end cover is in direct contact with the ground, thus the maintenance operation is convenient, and the space utilization rate is high.

With the manifold and the heat exchanger according to the embodiments of the present invention, since the end covers are generally located at the highest and lowest points of the heat exchanger, respectively, provision of the discharge passage at the end cover can ensure the gas discharging effect and the liquid discharging effect. In addition, the discharge passage 5 can achieve different functions in different positions, the discharge passage 5 can discharge the gas in the upmost position of the internal space of the heat exchanger, and can discharge the liquid in the lowermost position of the internal space of the heat exchanger, thereby saving the material.

When the first end of the discharge passage is located on the inner peripheral surface of the pipe and the second end of the discharge passage is located on the outer peripheral surface of the pipe, in order to effectively discharge the gas or liquid, the discharge passage needs to be higher than the first heat exchange tube or lower than the last heat exchange tube, which needs to lengthen the pipe, sacrificing the mounting space of the heat exchanger to a certain extent. With the manifold and the heat exchanger according to the embodiments of the present invention, the first end 51 of the discharge passage 5 is located on the side of the end cover 3 facing the inner cavity 4 of the pipe 2, and thus the mounting space of the heat exchanger can be effectively utilized without the need of lengthening the pipe.

Although the above embodiments are described, these embodiments and the features in these embodiments may be combined to form new embodiments.

What is claimed is:

1. A manifold for a heat exchanger, the manifold comprising:
   a pipe having an end portion;
   an end cover disposed at the end portion of the pipe and closing the end portion of the pipe to define an inner cavity in the pipe; and
   a discharge passage comprising: a first end opening into the inner cavity of the pipe, and a second end located at or adjacent to an end of the manifold and positioned at a radial outer peripheral surface of the manifold, the first end of the discharge passage being located on a side of the end cover facing the inner cavity of the pipe.

2. The manifold for the heat exchanger according to claim 1, further comprising:
   a seal detachably connected to the second end of the discharge passage to seal the second end of the discharge passage.

3. The manifold for the heat exchanger according to claim 1, wherein
   the discharge passage has a substantially L-shaped shape.

4. The manifold for the heat exchanger according to claim 1, wherein
   the second end of the discharge passage is located at or adjacent to the end portion of the pipe and positioned at an outer peripheral surface of the pipe; or
   the second end of the discharge passage is located at an outer peripheral surface of the end cover or a surface of a portion of the end cover exposing from an opening in a pipe wall of the pipe.

5. The manifold for the heat exchanger according to claim 1, wherein
   the end cover comprises: a first tubular portion inserted in the end portion of the pipe; and an end plate closing an end of the first tubular portion facing the inner cavity of the pipe, the end plate has a through hole, and the discharge passage comprises a discharge passage tube of which a first end is inserted in the through hole of the end plate.

6. The manifold for the heat exchanger according to claim 5, wherein
   the first tubular portion has a first tubular portion wall and an opening passing through the first tubular portion wall, the pipe has a pipe wall and an opening passing through the pipe wall at the end portion of the pipe and substantially aligning with the opening of the first tubular portion, and a second end of the discharge passage tube is inserted in the opening of the first tubular portion and the opening of the pipe.

7. The manifold for the heat exchanger according to claim 6, wherein
the opening of the first tubular portion is a through hole or a notch, and the opening of the pipe is a through hole or a notch.

8. The manifold for the heat exchanger according to claim 5, wherein
the end cover further comprises: a second tubular portion connected with the first tubular portion; and a step portion formed between the first tubular portion and the second tubular portion and abutting against an end face of the end portion of the pipe.

9. The manifold for the heat exchanger according to claim 8, wherein
the second tubular portion has a second tubular portion wall and an opening passing through the second tubular portion wall, and the second end of the discharge passage tube is inserted in the opening of the second tubular portion.

10. The manifold for the heat exchanger according to claim 9, wherein
the opening of the second tubular portion is a through hole or a notch.

11. The manifold for the heat exchanger according to claim 1, wherein
the end cover comprises: a first tubular portion inserted in the end portion of the pipe; and an end plate closing an end of the first tubular portion facing the inner cavity of the pipe; and the first tubular portion has a first tubular portion wall and a groove formed on an outer peripheral surface of the first tubular portion wall, the pipe has a pipe wall and a through hole passing through the pipe wall at the end portion of the pipe and substantially aligning with the groove of the first tubular portion; and the discharge passage comprises: a passage portion formed by the groove of the first tubular portion and an inner peripheral surface of the end portion of the pipe; and the through hole of the pipe.

12. The manifold for the heat exchanger according to claim 11, wherein
the end cover further comprises: a second tubular portion connected with the first tubular portion; and a step portion formed between the first tubular portion and the second tubular portion and abutting against an end face of the end portion of the pipe.

13. The manifold for the heat exchanger according to claim 1, wherein
the end cover comprises a first portion inserted in the end portion of the pipe; and the discharge passage comprises an end cover passage formed in the first portion of the end cover.

14. The manifold for the heat exchanger according to claim 13, wherein
the discharge passage further comprises a through hole passing through a pipe wall of the pipe at the end portion of the pipe and being in fluid communication with the end cover passage.

15. The manifold for the heat exchanger according to claim 1, wherein
the end cover comprises: a first portion inserted in the end portion of the pipe; and a protrusion protruding from an outer peripheral surface of the first portion on a side of the first portion away from the inner cavity of the pipe, the discharge passage is formed in the first portion of the end cover and the protrusion, the second end of the discharge passage is located in the protrusion, the pipe has a pipe wall and a notch passing through the pipe wall at the end portion of the pipe, and the protrusion is located in the notch.

16. The manifold for the heat exchanger according to claim 1, wherein
the end cover comprises: a first portion inserted in the end portion of the pipe; and a second portion connected with the first portion; and a step portion formed between the first portion and the second portion and abutting against an end face of the end portion of the pipe; and the discharge passage is formed in the first portion and the second portion of the end cover, and the second end of the discharge passage is located in the second portion.

17. The manifold for the heat exchanger according to claim 1, wherein
at least a portion of the discharge passage is located in the end cover.

18. The manifold for the heat exchanger according to claim 1, wherein
the second end of the discharge passage is spaced apart from an end face of the end of the manifold.

19. The manifold for the heat exchanger according to claim 5, wherein
the discharge passage tube is a capillary tube.

20. A heat exchanger comprising:
a heat exchange tube; and
the manifold according to claim 1, wherein an end of the heat exchange tube is connected and fluidly communicated with the manifold.

* * * * *